UNITED STATES PATENT OFFICE.

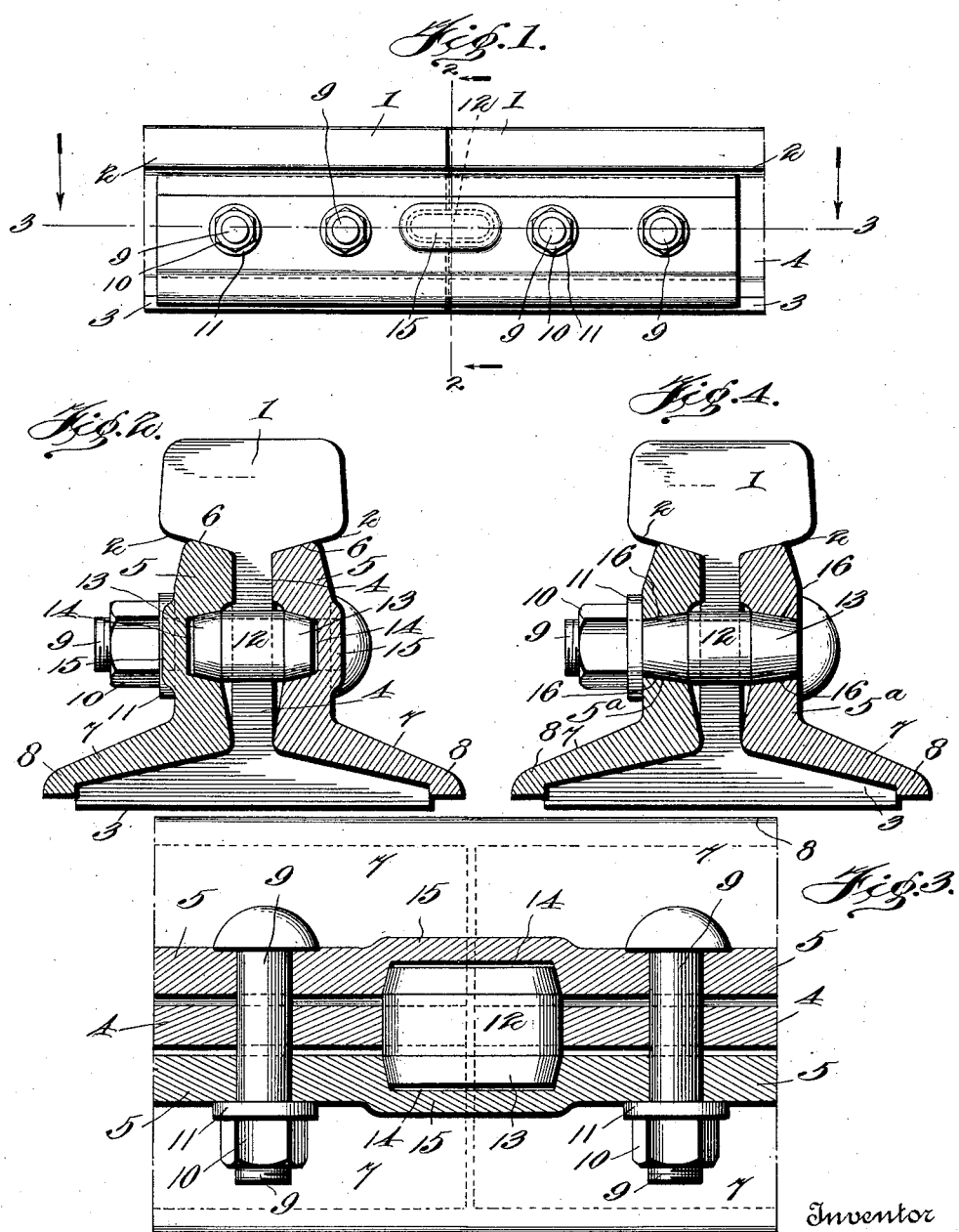

BYRON ELLSWORTH CARL, OF NEW YORK, N. Y.

RAILWAY-JOINT.

1,048,037.  Specification of Letters Patent.  Patented Dec. 24, 1912.

Application filed April 11, 1912. Serial No. 690,082.

*To all whom it may concern:*

Be it known that I, BYRON ELLSWORTH CARL, a citizen of the United States, residing at New York city, in the county of New York and State of New York, have invented certain new and useful Improvements in Railway-Joints; and I do hereby declare the following to be a full, clear, and exact description of the invention, such as will enable others skilled in the art to which it appertains to make and use the same.

My invention relates to improvements in joints for railways, and is intended to provide a strong, rigid, simple, and effective joint, which will hold the abutting ends of the rails against vertical movement during the passage of the rolling stock over the same, and yet which will permit the necessary longitudinal play of the rails, incident to expansion and contraction, due to variations in temperature.

My invention will be understood by reference to the accompanying drawings, in which the same parts are indicated by the same letters throughout the several views.

Figure 1 is a side elevation, showing the complete rail joint. Fig. 2 shows a section along the line 2—2 of Fig. 1, and looking in the direction of the arrows, parts being shown in elevation. Fig. 3 shows a section along the line 3—3 of Fig. 1, and looking down, parts being shown in elevation; and Fig. 4 is a similar view to Fig. 2, but shows a modification, in which the supporting block passes through the fish plates.

Referring first to Figs. 1, 2, and 3, the rail 1 is provided with the usual shoulders 2, beneath the head thereof, and with the usual flanges 3 and web 4, connecting the head and base of the rail. At each side of the web are fish plates 5, provided with faces 6, adapted to engage the shoulders 2 beneath the head of the rail, and with flanged bases 7, and downwardly projecting ends 8, to engage the flanges 3 at the base of the rail. The fish plates are held together by bolts 9 and nuts 10, beneath which nuts are washers 11, preferably of the form usually designed to prevent turning of the nuts.

The web of the abutting ends of the rail is cut away to receive the elliptical block 12, and to provide a slight clearance between the ends of said block and the ends of the elliptical slot in the web, so that provision may be had for the expansion and contraction of the rail. This block 12 is substantially elliptical, having arch-shaped ends and a flat main body portion, as shown in dotted lines in Fig. 1. At each side, this block 12 is provided with tapered wedge faces 13, to engage in corresponding sockets 14, formed in the inner side of the fish plates 5. These sockets 14 may extend only partly through the fish plates, the metal being pressed outward, as at 15, as shown in Figs. 1, 2, and 3; or the metal may be punched through entirely, as shown at 16 in Fig. 4. The bolts 9 being at either side of the supporting block 12, setting up of the nuts 10 will cause the sockets 14 in the fish plates to engage the wedge faces 13 of the block 12. To form a stiff, tight joint, the block 12 will support the free ends of the abutting rails, and will transmit any vertical strains on the top of the rail to the fish plates, and to the abutting rail; and the result will be a firm, rigid, and efficient joint.

It will be obvious that various modifications might be made in the herein described apparatus, and in the construction, combination, and arrangement of parts, which could be used without departing from the spirit of my invention.

Having thus described my invention, what I claim and desire to secure by Letters Patent of the United States is:—

1. In a railway joint, the combination with a pair of fish plates each provided with an elliptical tapered socket on the inner face thereof, of an elliptical supporting block provided with wedge faces at each edge adapted to engage in the tapered sockets, and to pass through and fit in a recess in the webs of the abutting rails, and means for clamping said fish plates together and for forcing said wedge faces of said block into said tapered sockets, substantially as described.

2. In a railway joint, the combination with a pair of fish plates each provided with an elliptical tapered socket on the inner face thereof, of an elliptical supporting block provided with wedge faces at each edge adapted to engage in the tapered sockets, and to pass through and fit in a recess in the webs of the abutting rails, bolts passing through said fish plates and through the webs of the rails, and nuts on said bolts for clamping said fish plates to the rails and for forcing said wedge faces of the supporting block into said tapered sockets, substantially as described.

3. In a railway joint, the combination with a pair of rails each having a semi-elliptical recess cut in the web at the end thereof, of a pair of fish plates each provided with an elliptical tapered socket on the inner face thereof, an elliptical supporting block provided with wedge faces at each edge adapted to engage in the tapered sockets, the main body of said block passing through said recesses in the webs of the abutting rails, and means for clamping said fish plates together and for forcing said wedge faces of said block into said tapered sockets, substantially as described.

4. In a railway joint, the combination with a pair of rails each having a semi-elliptical recess cut in the web at the end thereof, of a pair of fish plates each provided with an elliptical tapered socket on the inner face thereof, an elliptical supporting block provided with wedge faces at each edge adapted to engage in the tapered sockets, the main body of said block passing through said recesses in the webs of the abutting rails, and bolts passing through said fish plates and through the webs of the rails, with nuts on said bolts for clamping said fish plates to the rails and for forcing said wedge faces of the supporting block into said tapered sockets, substantially as described.

In testimony whereof, I affix my signature, in presence of two witnesses.

BYRON ELLSWORTH CARL.

Witnesses:
N. CURTIS LAMMOND,
B. H. DAILEY.

Copies of this patent may be obtained for five cents each, by addressing the "Commissioner of Patents, Washington, D. C."